United States Patent [19]

Haraguchi

[11] Patent Number: 4,943,092
[45] Date of Patent: Jul. 24, 1990

[54] STRUCTURE FOR MOUNTING SUSPENSION MEMBER BY LONGITUDINALLY ARRANGED ELASTIC BUSHES

[75] Inventor: Tetsunori Haraguchi, Susono, Japan

[73] Assignee: Toyota Jidosha Kabushiki Kaisha, Japan

[21] Appl. No.: 339,253

[22] Filed: Apr. 17, 1989

[30] Foreign Application Priority Data

Apr. 21, 1988 [JP] Japan .................................. 63-98524

[51] Int. Cl.⁵ ............................................ B62D 21/11
[52] U.S. Cl. .................................... 280/660; 280/671; 280/715; 280/717; 280/723; 280/788; 180/300; 180/58
[58] Field of Search ............... 280/660, 671, 689, 715, 280/716, 717, 723, 788, 781; 180/299, 300, 58, 312; 296/203, 204

[56] References Cited

U.S. PATENT DOCUMENTS

| | | | |
|---|---|---|---|
| 3,917,306 | 11/1975 | Madler et al. | 280/788 |
| 4,453,740 | 6/1984 | von der Obe et al. | 280/781 |
| 4,720,120 | 1/1988 | Shimatani et al. | 280/716 |
| 4,826,203 | 5/1989 | Kijima et al. | 280/788 |

Primary Examiner—Charles A. Marmor
Assistant Examiner—Tamara L. Finlay
Attorney, Agent, or Firm—Oliff & Berridge

[57] ABSTRACT

A structure for mounting a suspension member for supporting suspension control arms to the vehicle body with high resiliency in the longitudinal direction of the vehicle but high rigidity in the lateral direction as well as in turning as viewed from a top of the vehicle or as viewed in the longitudinal direction of the vehicle, the structure including substantially cylindrical elastic bushes disposed between the suspension member and the vehicle body to extend in the longitudinal direction of the vehicle and assist links restricting lateral shifting of longitudinal end portions of the suspension member relative to the vehicle body.

4 Claims, 3 Drawing Sheets

STRUCTURE FOR MOUNTING SUSPENSION MEMBER BY LONGITUDINALLY ARRANGED ELASTIC BUSHES

BACKGROUND OF THE INVENTION

1. Field of the Invention

The present invention relates to a structure for mounting a suspension member in a vehicle such as an automobile, and more particularly, to a structure for mounting a suspension member to a body of the vehicle.

2. Description of the Prior Art

As one of the supporting structures for the control arms in the suspension of a vehicle such as an automobile it is known to provide a suspension member in the form of an independent frame adapted to be supported from the vehicle body by vibration damping type connecting means and to mount the control arms to the suspension member. In order to improve the riding quality of the vehicle having such a suspension member, particularly to suppress the harshness, it is required that the mounting structure between the vehicle body and the suspension member has a relatively high flexibility in the longitudinal direction of the vehicle.

Such a flexibility between the vehicle body and the suspension member was provided in the conventional structure by the vibration damping means incorporated in the connecting means for mounting the suspension member to the vehicle body. Therefore, if the forces applied to the left side and right side wheels under driving or braking are different from one another, particularly when an anti-lock brake system or a traction control system is provided, the suspension member is rotated relative to the vehicle body as viewed from a top of the vehicle. Such a rotation of the suspension member causes toe changes of the wheels such as the tack-in or the like, and adversely affects the maneuvering stability of the vehicle.

Such a problem will still occur in a structure improved of the flexibility of the suspension member as described in, for example, Japanese Patent Publication No. 61-37152, in which the lateral frames of the suspension member are formed to have an open cross section so as to be relatively rigid against the lateral forces while relatively flexible for twisting under longitudinal forces. Therefore, the flexibility or rigidity of the vibration damping mount for the suspension member was conventionally determined in general under a compromise between the riding quality and the stability of the vehicle, and therefore the riding quality and the maneuvering stability were respectively not always very satisfactory.

SUMMARY OF THE INVENTION

Therefore, it is the an object of the present invention to provide a structure for mounting the suspension member to the vehicle body in such a manner that a sufficient flexibility between the suspension member and the vehicle body is ensured in the longitudinal direction of the vehicle while a high rigidity is ensured against the rotation of the suspension member relative to the vehicle body as viewed from a top of the vehicle so that the riding quality and the maneuvering stability are both highly satisfactory and good vibration shielding and vibration suppressing performances are available.

According to the present invention, the above-mentioned object is accomplished by a structure for mounting a suspension member to a body of a vehicle, said suspension member supporting control arms at opposite sides of the vehicle, comprising: four substantially cylindrical elastic bushes disposed at four points of said suspension member spaced in the longitudinal and lateral directions of the vehicle, said bushes each being interposed between said suspension member and the vehicle body to extend in the longitudinal direction of the vehicle, and two assist links disposed at two points spaced in the longitudinal direction of the vehicle, said assist links each being engaged between said suspension member and the vehicle body to restrict lateral shiftings of said suspension member relative to said body.

According to the above-mentioned structure, since the elastic bushes incorporated between the suspension member and the vehicle body are substantially cylindrical elastic bushes extending substantially in the longitudinal direction of the vehicle, a high flexibility is available from such bushes in the longitudinal direction of the vehicle while the bushes hold relatively high rigidity in the lateral direction perpendicular to the longitudinal direction. Therefore, the suspension member is supported from the vehicle body to be sufficiently flexible in the longitudinal direction but to be highly rigid in the lateral direction relative to the vehicle body.

Further, according to the above-mentioned structure, since the suspension member is substantially restricted of its lateral movement relative to the vehicle body by said assist links at two points substantially spaced from one another in the longitudinal direction, the rotation of the suspension member relative to the vehicle body as viewed from a top of the vehicle is effectively suppressed.

Thus, by such a high flexibility of the suspension member relative to the vehicle body in the longitudinal direction, the riding quality of the vehicle is improved, and by such a high rigidity of the suspension relative to the vehicle body in the lateral directions which effectively suppress the rotation of the suspension member relative to the vehicle body as viewed from a top of the vehicle and also as viewed from a front or a rear of the vehicle, the maneuvering stability of the vehicle is improved. Since the vibration of the suspension member in the vertical directions and in the rotational direction as viewed from a side of the vehicle are damped by the elastic bushes, the noise and vibration suppressing performance of the suspension is ensured.

According to a detailed feature of the present invention, said assist link may be made of a wishbone type link pivotally connected with the vehicle body at two foot ends thereof spaced from one another in the lateral direction of the vehicle and an I-type link pivotally connected with an apex portion of said wishbone type link at one end thereof and with said suspension member at another end thereof so as thereby to extend substantially in the lateral direction of the vehicle. However, as an alternative, such a combination of the wishbone type link and the I-type link may be used in a reversed manner so that the two foot ends of the wishbone type link are pivotally connected with the suspension member while another end of the I-type link is pivotally connected with the vehicle body.

According to another detailed feature of the present invention, said assist link may be made of a wishbone type link pivotally connected with said suspension member at two foot ends thereof spaced from one another substantially in the lateral direction of the vehicle and an I-type link pivotally connected with an apex portion of said wishbone type link at one end thereof and with the vehicle body at another end thereof.

According to still another detailed feature of the present invention, in either of the above-mentioned assist link structures, the pivot points between said wishbone type link and said I-type link may be positioned below the corresponding elastic bushes.

The present invention will now be described with respect to a preferred embodiment thereof with reference to the accompanying drawings.

BRIEF DESCRIPTION OF DRAWINGS

In the accompanying drawings.

DESCRIPTION OF THE PREFERRED EMBODIMENT

Figure 1:
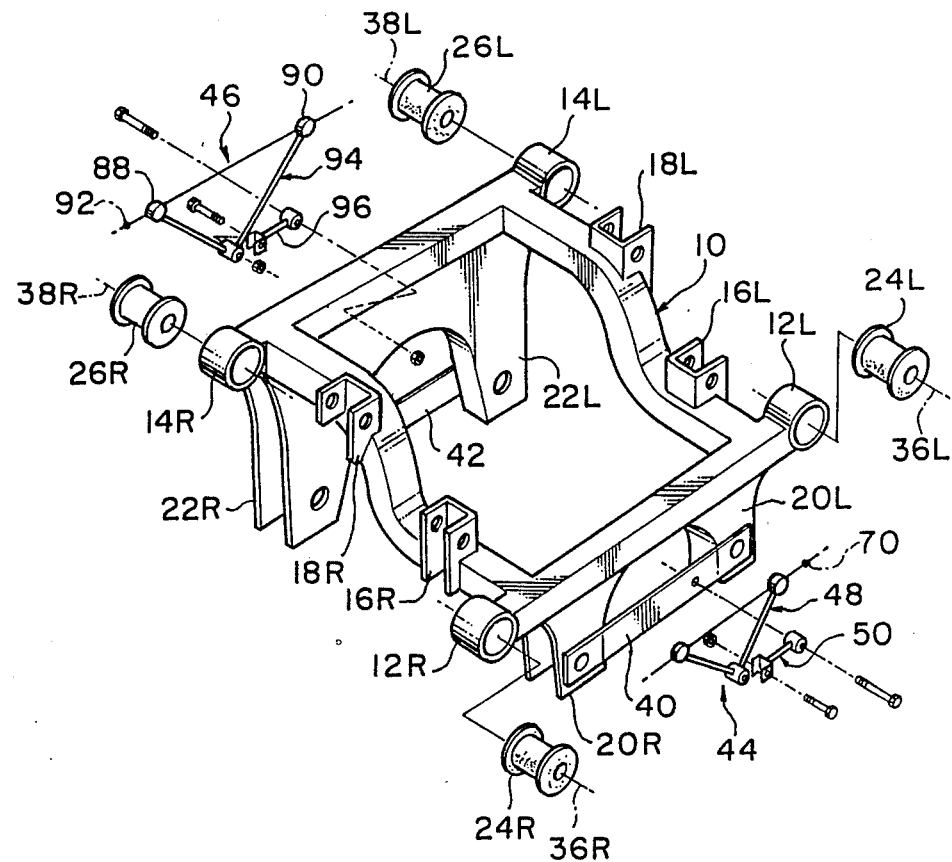
FIG. 1 is an exploded perspective view of an embodiment of the mounting structure according to the present invention seen from a point obliquely forward thereof.

Referring to FIG. 1, 10 designates a suspension member adapted to support upper and lower control arms (not shown) at opposite side portions of the vehicle. The suspension member in the shown embodiment has the shape of a rectangular frame including a stepped portion at a longitudinally intermediate portion thereof. At four edge portions of the suspension member 10 are integrally provided sleeves 12R, 12L, 14R and 14L so as to extend in the longitudinal direction of the vehicle.

Between the sleeves 12R and 14R the suspension member 10 is integrally provided with brackets 16R and 18R for supporting right side upper control arms, and between the sleeves 12L and 14L it is also integrally provided with brackets 16L and 18L for supporting left side upper control arms. Further, at a front end the suspension member 10 is integrally provided with brackets 20R and 20L for supporting right and left side lower control arms and at a rear end it is also integrally provided with brackets 22R and 22L for supporting right side and left side lower control arms, respectively.

Figure 2:
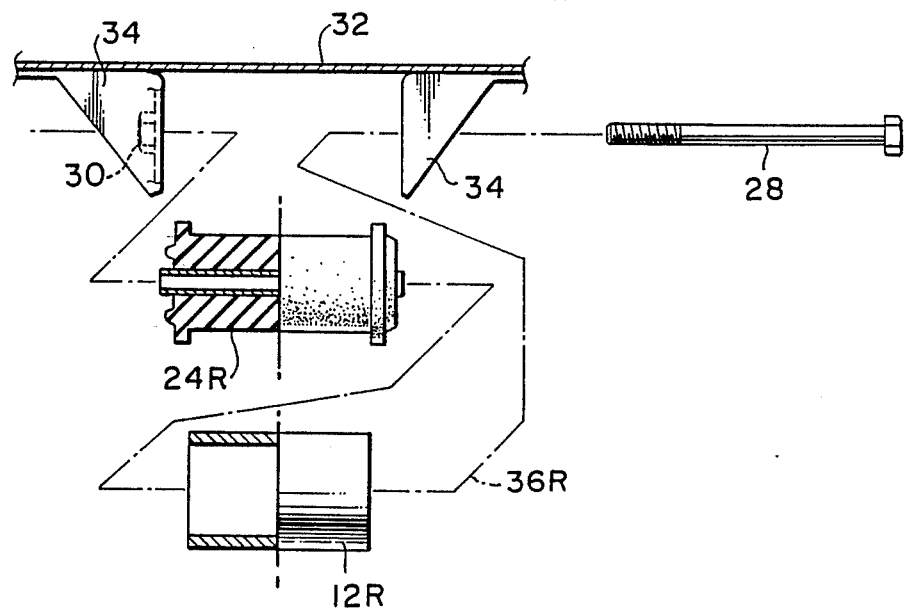
FIG. 2 is a diaphragmatic view showing the connection of the suspension member with the vehicle body by a cylindrical rubber bush in a disassembled state.

Rubber bushes 24R, 24L, 26R and 26L are inserted into the sleeves 12R, 12L, 14R and 14L, respectively, as shown in more detail in FIG. 2 with respect to the rubber bush 24R and the sleeve 12R, and each of these sleeves is connected with a pair of brackets 34 fixedly mounted to the vehicle body 32 by a bolt 28 being inserted through the rubber bush and fastened by a nut 30. In the shown embodiment the rubber bushes 24R, 24L, 26R and 26L are formed in a cylindrical shape, and therefore they provide a large flexibility in a direction along their central axes 36R, 36L, 38R and 38L but a small flexibility in the directions perpendicular to said central axes.

A reinforcing plate member 40 is fixed to the brackets 20R and 20L to bridge therebetween, and similarly a reinforcing plate member 42 is fixed to the brackets 22R and 22L to bridge therebetween. These reinforcing plate members 40 and 42 are connected with the vehicle body not shown in the figure by assist links 44 and 46, respectively.

Figure 3:
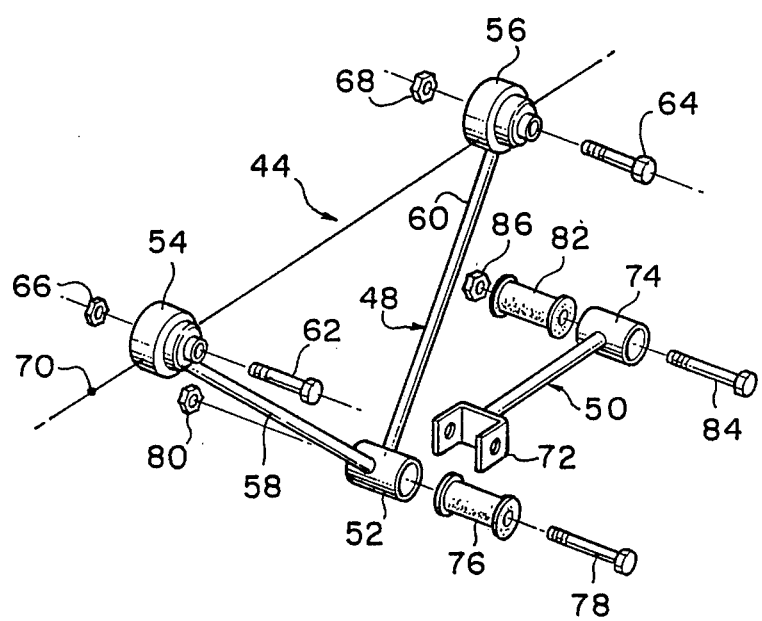
FIG. 3 is an exploded perspective view showing an assist link on one side of the suspension member.

As shown in more detail in FIG. 3, the assist link 44 includes a V-shaped wishbone type link 48 and I-type link 50. The wishbone type link 48 has two leg portions 58 and 60 integrally connected at first ends thereof via a sleeve 52 to present an apex end and having ball joints 54 and 56 at two foot ends thereof, and is connected with the vehicle body to be pivotal about a pivot axis 70 by bolts 62 and 64 being inserted through the ball joints 54 and 56 fastened by nuts 66 and 68, respectively.

The I-type link 50 has a bracket 72 at one end thereof formed to be integral therewith and a sleeve 74 at another end thereof formed to be integral therewith, and is pivotally connected at said one end thereof with the apex portion of the wishbone type link 48 by the bracket 72 and the sleeve 52 being commonly penetrated by a bolt 78 with a rubber bush 76 being inserted into the sleeve 52 and fastened by a nut 80. The I-type link 50 extends substantially laterally relative to the vehicle, and is pivotally connected with the reinforcing plate member 40 by a rubber bush 82 being inserted into the sleeve 74, a bolt 84 being passed through the rubber bush and a hole formed in the reinforcing plate member 40 and fastened by a nut 86.

The assist link 46 is constructed in the same manner as the assist link 44, so as to include a wishbone type link 94 connected with the vehicle body at two points spaced from one another in a lateral direction of the vehicle via ball joints 88 and 90 to be pivotal about a pivot axis 92, and an I-type link 96 pivotally connected at one end thereof with an apex point of said wishbone type link and at another end thereof with the reinforcing plate member 42 of the suspension member 10 so as to extend substantially in the lateral direction of the vehicle.

Thus, the suspension member is supported from the vehicle body at four points spaced in the longitudinal and lateral directions of the vehicle by the cylindrical rubber bushes each extending substantially in the longitudinal direction of the vehicle so as thereby to have a relatively large flexibility in the longitudinal direction of the vehicle but to have a small flexibility in the directions perpendicular to the longitudinal direction. Further, the suspension member is connected with the vehicle body at the two points spaced from one another in the substantially longitudinal direction of the vehicle so as to be restricted of the movements thereof in the substantially lateral direction relative to the vehicle by the assist links so as thereby to have a sufficient rigidity against the lateral movements and the rotations as viewed from a top of the vehicle as well as in a longitudinal direction of the vehicle. Thus, a good maneuvering stability of the vehicle is ensured. Further, the rubber bushes incorporated in the four edge portions of the suspension and in the assist links have the effect of interrupting transmission of vibration from the suspension member to the vehicle body, and therefore improve the quietness of and in the vehicle.

In the shown embodiment the front and the rear sets of sleeves are vertically offset from one another. By this arrangement the rigidity against the rotation of the suspension member as viewed in the longitudinal direction of the vehicle is also increased.

The apex point of the two wishbone type links are positioned below the pivot points thereof with the vehicle body. The rotational moment of the suspension member as viewed in the longitudinal direction of the vehicle is expressed as "the difference in height between the apex point of the wishbone type link and a roll center of the suspension" times "lateral force of the wheel". Therefore, the rotational moment of the suspension member according to the above-construction is decreased as compared with a structure having no such wishbone type link or a structure in which the apex point of the wishbone type link is positioned above the pivot connection thereof with the vehicle body. By this arrangement the rigidity of the suspension member against the rotation as viewed in the longitudinal direction of the vehicle is also increased. In the construction according to the present invention, particularly when the height of the apex point of the wishbone type link is brought into coincidence with the height of the roll center of the vehicle body, the rotational moment of the suspension member is minimized, thereby substantially increasing the rigidity thereof against the rotation as viewed in the longitudinal direction of the vehicle.

Figure 4:
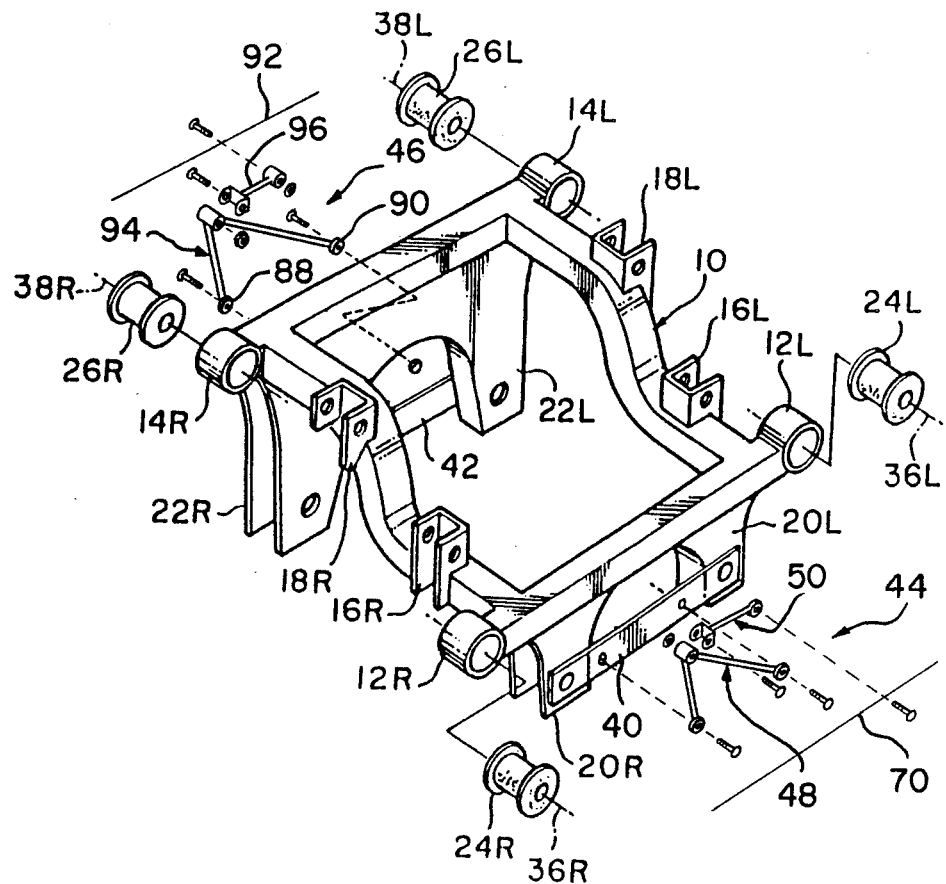
FIG. 4 is an exploded perspective view of a second embodiment of the present invention seen from a point obliquely forward thereof.

Although the present invention has been described in detail with respect to a particular embodiment thereof, it will be clear to those skilled in the art that various other embodiments are possible within the scope of the present invention. For example, as shown in FIG. 4, the assist links 44 and 46 may be so constructed that they are pivotally connected with the suspension member on the side of the wishbone type links and with the vehicle body on the side of the I-type link.

I claim:

1. A structure for mounting a suspension member to a body of a vehicle, said suspension member supporting control arms at opposite sides of the vehicle, comprising: four substantially cylindrical elastic bushes disposed at four points of said suspension member spaced in the longitudinal and lateral directions of the vehicle, said bushes each being interposed between said suspension member and the vehicle body to extend in the longitudinal direction of the vehicle, and two assist links disposed at two points spaced in the longitudinal direction of the vehicle, said assist links each being engaged between said suspension member and the vehicle body to restrict lateral shiftings of said suspension member relative to said body.

2. A structure for mounting a suspension member according to claim 1, wherein said suspension member has four cylindrical sleeves each being oriented to extend in the longitudinal direction of the vehicle, and said bushes are each longitudinally received in each corresponding said sleeve.

3. A structure for mounting a suspension member according to claim 1, wherein said assist link is a combination of a wishbone type link having two leg portions integrally connected at first ends thereof to present an apex end and two foot ends and an I-type link pivotally connected with said apex end of said wishbone type link at one end thereof, said two foot ends of said wishbone type link being pivotally connected with the vehicle body and another end of said I-type link being pivotally connected with said suspension member.

4. A structure for mounting a suspension member according to claim 1, wherein said assist link is a combination of a wishbone type link having two leg portions integrally connected at first ends thereof to present an apex end and two foot ends and an I-type link pivotally connected with said apex end of said wishbone type link at one end thereof, said two foot ends of said wishbone type link being pivotally connected to said suspension member and another end of said I-type link being pivotally connected to said vehicle body.

* * * * *